(12) United States Patent
Liu et al.

(10) Patent No.: US 10,229,451 B2
(45) Date of Patent: Mar. 12, 2019

(54) METHOD AND APPARATUS FOR PROCESSING TRANSACTION INFORMATION FOR COMMODITY OBJECT

(71) Applicant: ALIBABA GROUP HOLDING LIMITED, George Town, Grand Cayman (KY)

(72) Inventors: Xichun Liu, Hangzhou (CN); Baoyou Cheng, Hangzhou (CN); Xiangfei Huang, Hangzhou (CN); Wei Zhang, Hangzhou (CN); Zhenjie Wang, Hangzhou (CN); Haiquan Zhang, Hangzhou (CN); Junlin Zhu, Hangzhou (CN); Heng Li, Hangzhou (CN); Shisheng Liu, Hangzhou (CN); Zengguang Liu, Hangzhou (CN); Libin Sun, Hangzhou (CN); Zhen Yang, Hangzhou (CN); Yong Wu, Hangzhou (CN); Liwen Xie, Hangzhou (CN); Hongwei Zhao, Hangzhou (CN); Zhebin Tao, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 607 days.

(21) Appl. No.: 14/745,119

(22) Filed: Jun. 19, 2015

(65) Prior Publication Data
US 2016/0019632 A1    Jan. 21, 2016

(30) Foreign Application Priority Data
Jul. 21, 2014    (CN) .......................... 2014 1 0347949

(51) Int. Cl.
*G06Q 30/06*    (2012.01)
*G06Q 10/08*    (2012.01)

(52) U.S. Cl.
CPC ..... *G06Q 30/0635* (2013.01); *G06Q 10/0836* (2013.01)

(58) Field of Classification Search
CPC ......... G06Q 30/06; G06Q 40/04; G06Q 40/00
(Continued)

(56) References Cited

U.S. PATENT DOCUMENTS 5,038,284 A    8/1991  Kramer
5,265,008 A    11/1993 Benton et al.
(Continued)

FOREIGN PATENT DOCUMENTS

CN    101271561 A    9/2008
CN    101567070 A    10/2009
(Continued)

OTHER PUBLICATIONS

PCT International Search Report and Written Opinion dated Sep. 18, 2015, issued in corresponding International Application No. PCT/US2015/036700 (8 pages).
(Continued)

*Primary Examiner* — Oluseye Iwarere
(74) *Attorney, Agent, or Firm* — Finnegan, Henderson, Farabow, Garrett & Dunner, LLP (57) ABSTRACT

A method for processing transaction information for a commodity object is provided. The method includes receiving a request for purchasing a commodity object and generating, based on the request, a transaction order. The transaction order may include transaction amount information, information about a first user selling the commodity object, and information about a second user purchasing the commodity object. The method may further include setting an amount of fund in a fund account of the second user to a frozen state, and after a preset time period, transferring the amount of fund to a fund account of the first user. After the
(Continued)

amount of fund is set to the frozen state and before the amount of fund is transferred to the fund account of the first user, an income produced by the amount of fund may be calculated and transferred to the fund account of the second user.

27 Claims, 5 Drawing Sheets

(58) Field of Classification Search
 USPC .................................. 705/37, 26.81, 44
 See application file for complete search history.

(56) References Cited

U.S. PATENT DOCUMENTS

| | | | |
|---|---|---|---|
| 5,880,446 A | 3/1999 | Mori et al. | |
| 6,754,636 B1 | 6/2004 | Walker et al. | |
| 7,849,005 B2 | 12/2010 | Ong | |
| 8,583,479 B1 | 11/2013 | Wang et al. | |
| 2002/0013767 A1 | 1/2002 | Katz | |
| 2002/0029171 A1* | 3/2002 | Senior | G06Q 30/02 705/413 |
| 2002/0069156 A1 | 6/2002 | Adam et al. | |
| 2002/0143693 A1* | 10/2002 | Soestbergen | G06Q 30/06 705/37 |
| 2003/0093355 A1* | 5/2003 | Issa | G06Q 30/08 705/37 |
| 2004/0068448 A1* | 4/2004 | Kim | G06Q 20/04 705/40 |
| 2004/0260632 A1 | 12/2004 | Wanasek | |
| 2006/0136337 A1* | 6/2006 | Sheikhrezai | G06Q 20/02 705/44 |
| 2007/0233594 A1* | 10/2007 | Nafeh | G06Q 40/00 705/37 |
| 2008/0195488 A1* | 8/2008 | Orgad | G06Q 30/0213 705/14.15 |
| 2009/0076941 A1 | 3/2009 | Schneierson et al. | |
| 2012/0166311 A1* | 6/2012 | Dwight | G06Q 30/0613 705/26.43 |
| 2012/0254009 A1 | 10/2012 | Thorp | |
| 2012/0284147 A1 | 11/2012 | Nie et al. | |
| 2013/0018743 A1* | 1/2013 | Yang | G06Q 10/10 705/26.2 |
| 2013/0036017 A1 | 2/2013 | Galloway | |
| 2013/0218749 A1 | 8/2013 | Mani | |
| 2013/0339196 A1* | 12/2013 | Chen | G06Q 30/02 705/27.1 |
| 2014/0058855 A1* | 2/2014 | Hussein | G06Q 20/405 705/16 |
| 2014/0236822 A1* | 8/2014 | King | G06Q 20/22 705/44 |
| 2014/0316972 A1* | 10/2014 | Yan | G06Q 40/04 705/37 |
| 2015/0220928 A1* | 8/2015 | Allen | G06Q 20/0655 705/67 |
| 2015/0302368 A1* | 10/2015 | Dermosessian | G06Q 20/10 705/39 |
| 2015/0310384 A1* | 10/2015 | Chen | G06Q 10/083 705/26.81 |
| 2015/0363850 A1* | 12/2015 | Wang | G06Q 30/06 705/26.4 |
| 2016/0019632 A1* | 1/2016 | Liu | G06Q 30/0635 705/26.81 |

FOREIGN PATENT DOCUMENTS

| | | |
|---|---|---|
| CN | 102859549 A | 1/2013 |
| CN | 104346719 A | 2/2015 |
| WO | WO 2012/162153 A2 | 11/2012 |

OTHER PUBLICATIONS

Chinese Search Report issued by the State Intellectual Property Office of the People's Republic of China in corresponding Chinese Application No. 201410347949.9 dated Sep. 26, 2018 (1 page).

* cited by examiner

METHOD AND APPARATUS FOR PROCESSING TRANSACTION INFORMATION FOR COMMODITY OBJECT

CROSS-REFERENCE TO RELATED APPLICATION

This application is based upon and claims priority to Chinese Patent Application No. 201410347949.9, filed Jul. 21, 2014, the entire contents of which are incorporated herein by reference.

TECHNICAL FIELD

The present disclosure generally relates to the field of information processing technologies and, more particularly, to a method and apparatus for processing transaction information for a commodity object.

BACKGROUND

With the continuous improvement of e-commerce transaction platforms and the rapid development of communication technologies, an increasing number of people shop online to get commodities they need. The categories of commodities may be associated with every aspect of people's daily life, including commodity objects that belong to the category of automobile.

In transactions on e-commerce transaction platforms for commodities involving a large amount of fund, such as categories of automobile and major appliance, consumers are usually unwilling to fulfill the full payment or a large proportion of payment in a virtual network environment. The consumers instead make deals by paying a small-amount deposit or in other manners. However, in such cases, it is difficult to confirm the purchase intention of the consumers, and the sellers are unwilling to deliver goods if a full payment or at least a certain proportion of the full payment is not received. It can be seen that, the mutual restriction between the fund flow and the commodity flow hinders the smooth e-commerce transaction of commodities in which a large amount of fund is involved.

SUMMARY

The present disclosure provides a method for processing transaction information for a commodity object. The method includes receiving a request for purchasing a commodity object and generating, based on the request, a transaction order. The transaction order may include transaction amount information, information about a first user selling the commodity object, and information about a second user purchasing the commodity object. The method may further include setting an amount of fund in a fund account of the second user to a frozen state according to the transaction amount information, and after a preset time period, transferring the amount of fund to a fund account of the first user. After the amount of fund is set to the frozen state and before the amount of fund is transferred to the fund account of the first user, an income produced by the amount of fund may be calculated and transferred to the fund account of the second user.

Consistent with some embodiments, this disclosure provides an apparatus for processing transaction information for a commodity object. The apparatus includes a request receiving unit configured to receive a request for purchasing a commodity object and a transaction order generating unit configured to generate, based on the request, a transaction order. The transaction order may include transaction amount information, information about a first user selling the commodity object, and information about a second user purchasing the commodity object. The apparatus may further include a fund freezing unit configured to set an amount of fund in a fund account of the second user to a frozen state according to the transaction amount information. The apparatus may further include a fund transfer unit configured to transfer the amount of fund to a fund account of the first user after a preset time period. After the amount of fund is set to the frozen state and before the amount of fund is transferred to the fund account of the first user, an income produced by the amount of fund may be calculated and transferred to the fund account of the second user.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Consistent with some embodiments of this disclosure, a method to process transaction information for commodity objects on e-commerce transaction platforms is provided as follows. In order to facilitate a transaction of large-amount commodity objects in an e-commerce platform, a part of fund in a fund account of the purchaser user may be frozen after a purchaser user selects a commodity object and places an order. After the fund is frozen, a seller user may deliver the goods first, while the frozen fund remains in the fund account of the purchaser user and an income produced by this part of fund still belongs to the purchaser user. After a given time period, the frozen fund may be transferred to an account of the seller user. Further, to avoid a financial strain of the seller user, a financing product may be generated with reference to the order amount and an interest rate that the seller user is capable of providing, such that the seller user may obtain the fund from others using the order amount. In doing so, the method allows the purchaser user to receive the commodity object in advance of making the payment and continue to obtain financing income in a certain period of time. On the other hand, the seller user can obtain injected fund in advance by means of financing, despite the fact that the actual payment of the purchaser is delayed. As a result, actual production and other processes are not affected by late payment of the fund, facilitating consummation of transactions of large-amount commodity objects in an e-commerce platform.

Figure 1:
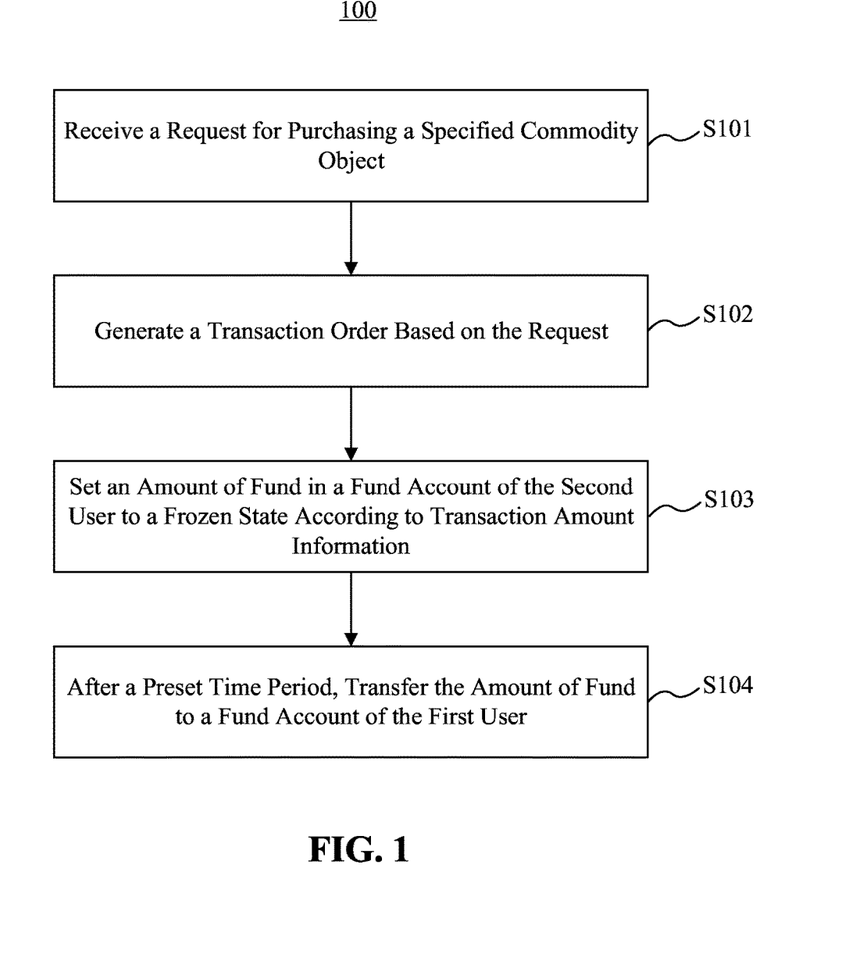
FIG. 1 is a flowchart of an exemplary method for processing transaction information for a commodity object, consistent with some embodiments of this disclosure.

FIG. 1 is a flowchart of an exemplary method 100 for processing transaction information for a commodity object, consistent with some embodiments of this disclosure. The method 100 may be performed by a server providing e-commerce services. Referring to FIG. 1, the method 100 includes the following steps.

In step S101, the server receives a request for purchasing a specified commodity object. The specified commodity object may include commodity objects that belong to commodity categories which involve a large purchase amount, such as the category of house property, the category of automobile, the category of household appliance, etc. For example, commodities such as a house property, an automobile, and a household appliance may be listed as commodity objects in a transaction platform, and a purchaser user may browse the commodity objects (including viewing details and the like). If a commodity object meets the requirement of the purchaser user, the purchaser user may directly click a button such as "purchase," and correspondingly, the server may receive a request for purchasing the commodity object.

In some embodiments, to distinguish the commodity objects that require processing of transaction information from commodity objects that involve a small purchase amount and do not need such processing, commodity categories which provide transaction information processing may be designated. For example, commodity categories such as the category of house property, the category of automobile, and the category of household appliance may be designated as categories in which transaction information processing is provided for transactions of commodity objects listed in the categories.

In step S102, the server may generate a transaction order based on the request. For example, the transaction order may include transaction amount information, information about a seller user who sells the specified commodity object, and information about a purchaser user who purchases the specified commodity object. In the following description of the present application, a user who sells the specified commodity object is referred to as the first user, and a user who purchases the specified commodity object is referred to as the second user.

This embodiment of the present disclosure provides a transaction information processing method mainly for large-amount commodity objects, and these types of commodities generally have the following characteristics. For many large-amount commodity objects, manufacturer-based physical stores are available offline. For example, in terms of automobile commodity objects, authorized car dealerships such as automobile 4S (Sale, Spare part, Service and Survey) stores are available offline selling automobile commodity objects. As to household appliance commodity objects, there are offline household appliance exclusive shops, department stores, and the like. Moreover, since such types of commodities involve a large amount of payment, after the purchaser user places an order online, the purchaser user may need to confirm some details with sales staff face to face when actually purchasing the commodity, so as to determine whether the commodity is needed by the purchaser user. This is different from other commodity objects that involve a small purchase amount, for which usually the seller does not deliver goods directly by express service. Therefore, stores may be opened in the e-commerce transaction platform based on the manufacturer of the commodity object. In the meantime, information of association with some offline physical stores may be established for the manufacturer-based online stores, and geographical location information of each physical store may be stored as well. Thus, when purchasing the specified commodity object, the second user may further choose, among the offline physical stores associated with the first user, an offline physical store located close to the residence of the second user or the pick-up address. The second user can then pick up goods at the offline physical store. To provide offline pick up options for the second user, the information about the first user may further comprise the information of the offline physical stores associated with the first user.

In some embodiments, the offline physical store suitable for the second user may also be determined by means of automatic acquisition or in other manners. For example, a server database may store historical transaction records of the second user, which may include address information related to the second user, such as a delivery address involved in each transaction record. Correspondingly, a possible address of the second user may be determined based on the address information. The offline physical store suitable for the second user may then be determined based on the geographical location information of each offline physical store, and information of the offline physical store may be recorded in the transaction order.

In step S103, the server may set an amount of fund in a fund account of the second user to a frozen state based on the transaction amount information. Generally, a specific amount is specified for the commodity object released in the transaction platform. The amount may be a full payment of the commodity object, or partial payment as an initial payment. For example, the amount may be determined according to a specific sales strategy of the first user. Regardless of the specific sales strategy, transaction amount information is associated with the commodity object released in the transaction platform, and the amount information in the transaction order is determined according to the transaction amount information.

In this embodiment, after receiving the purchasing request of the second user and generating the transaction order, the corresponding amount in the fund account of the second user may be frozen. For example, the amount frozen may be less than or equal to the transaction amount of the commodity object.

It some embodiments, after the amount of fund in the fund account of the second user is frozen, the amount of fund is owned by the first user legally speaking, but the fund remains to be in the fund account of the second user. The fund may be frozen by being added with a frozen state identifier or in other manners, and the second user is not allowed to withdraw this part of fund, or use this part of fund to pay for other commodity objects.

In step S104, after a preset time period, the server may transfer the amount of fund to a fund account of the first user.

After the amount of fund in the fund account of the second user is frozen, although the fund is not actually transferred to the fund account of the first user, this amount of fund belongs to the first user in terms of legal effect. As such, the first user can deliver goods to the second user, and the second user can receive the corresponding goods and start using the goods. After a preset time period, for example, after a given time limit (such as 3 months or 6 months), the frozen amount may be transferred to the fund account of the first user.

After the amount of fund is set to the frozen state and before the fund is transferred to the fund account of the first user, an income produced by the frozen fund may be transferred to the fund account of the second user. For example, the fund account of the first user may be an account opened in products such as Yu'ebao (an online finance and transaction service), and according to the feature of Yu'ebao, a financing income can be provided for the fund in the fund account. In other words, although the amount of fund should belong to the first user in terms of legal force after being frozen, the financial income produced by this part of fund still belongs to the second user. Thus, after acquiring the right to use the commodity object, the second user can still enjoy the financial income brought by the fund for purchasing the commodity object, which provides an incentive for the purchase of the second user and improves the security of the transaction. When delivering goods, the first user may not have received the payment for the commodity object from the second user yet, that is, there may be a delay before the first user receives the payment. Nonetheless, because of the potential rise of sales volume, so long as fund for the production of the commodity object is guaranteed, the arrangement may also be beneficial for the first user.

The length of the time period before the amount of fund frozen is transferred to the fund account of the first user may be set according to practical needs. There may be various ways to set the start time of the time period. For example, if the first user can immediately deliver goods for the second user after receiving the transaction order, and no additional procedure such as communication and confirmation by the second user in the offline physical store is to be performed (that is, the transaction order is in an effective state the moment it is generated), the preset time period can be set to start from the moment when the transaction order is generated and/or the corresponding amount of fund is frozen. As another example, the preset time period may be started when the first user delivers goods. One reason for starting the preset time period at the delivery time is that the second user may have the opportunity to cancel the order after a transaction order is generated until the first user delivers goods. Once the first user delivers the goods, the order generally can no longer be cancelled. Moreover, if the second user does not cancel the order before the first user delivers the goods, it generally indicates that the second user has a strong purchase intention, and will likely not cancel the order.

When the first user is associated with some offline physical stores, after the second user places an order in the e-commerce transaction platform, the second user may require communicating with the seller face to face in one of the offline physical stores. In some embodiments, information of the associated offline physical store may be recorded in the generated transaction order, and after the transaction order is generated, a delivery voucher may be generated. For example, the delivery voucher may be sent to the second user and displayed in a terminal device of the second user. Subsequently, the second user may carry the terminal device to the associated offline physical store to pick up the goods, and communicate with the sales staff face to face on related issues during the pick-up process. If both parties reach an agreement, the second user may provide the delivery voucher to the offline physical store, and a client of the offline physical store may verify the delivery voucher of the second user. If the verification succeeds, the transaction order may be set to an effective state. In other words, the transaction order previously generated online represents that the second user has a capability of purchasing the specified commodity object. Whether the second user actually purchases the specified commodity object depends on the face-to-face communication when the second user picks up the goods. The transaction order is set to the effective state only when the delivery voucher passes the verification, and the preset time period for transferring the frozen fund to the first user may be set to start from this moment.

Various implementations may be used to generate and verify the delivery voucher. For example, a character string of a preset length may be generated, description information of the specified commodity object may be extracted from the transaction order, and then the delivery voucher may be generated to include the character string and the description information of the specified commodity object. A corresponding relation between the transaction order and the character string may be stored at the server after the delivery voucher is generated. When the delivery voucher is provided at the offline physical store for picking up delivery of goods, the character string and transaction order identification information may be submitted by a client of the offline physical store. The server may determine, according to the stored corresponding relation, whether the two pieces of information submitted by the client of the offline physical store are consistent, and if the two pieces of information are consistent, the verification succeeds.

In some embodiments, after the transaction order is generated, the second user may also be required to input identification information of the second user (such as an ID card number), and the identification information may be sent to the first user and/or the client of the associated offline physical store along with the transaction order. When verifying the delivery voucher, the offline physical store may further verify the identification information of the second user. To avoid leakage of the identification information of the user during transmission, a part of the identification information may be set to an invisible state. For example, a part of the identification information may be encrypted or replaced with special characters such as *. Staff of the offline physical store may only be able to view the part of the identification information set in a visible state, such as the first three characters and the last four characters of the ID card number.

After the delivery voucher of the second user passes the verification by the offline physical store, in addition to starting the preset time period, the first user or the offline physical store may deliver goods for the second user, such that the second user receives the goods as soon as possible. In one implementation, if a delay in reception of the sales fund does not affect the actual production of the first user, the first user may deliver goods for the second user after the delivery voucher passes the verification.

In some circumstances, the manufacturer may need to have the fund available as soon as possible for large-amount commodities, in order to produce a new batch of commodities. For example, in the case of limited production fund, a delay in reception of the sales fund of the commodity object that has been delivered may affect other production activities.

In some embodiments, a financing commodity object corresponding to the transaction order may be generated according to an order amount, a due time, and income calculation mode information determined by the first user, and a purchase link of the financing commodity object may be provided for users in the e-commerce transaction platform. Users in the transaction platform may check detailed information of the financing commodity object, and purchase the financing commodity object when the financing commodity object meets their requirements. When a large transaction amount is involved, the amount of the financing commodity object is generally large as well. The amount of the financing commodity object may be divided into several shares such that a user may choose to purchase one or several shares when purchasing the financing commodity object. After purchase information of a third user is received through the purchase link of the financing commodity object, an amount purchased by the third user may be transferred from a fund account of the third user to the fund account of the first user. The third user may be any user in the transaction platform including the purchaser of the commodity object, namely, the second user.

In some embodiments, after a cumulative sales amount about the financing commodity object reaches the transaction amount in the transaction order (that is, the financing commodity object is sold out), the transaction order corresponding to the financing commodity object may be queried to determine the associated offline physical store from the transaction order. The client of the associated offline physical store may be notified to deliver the specified commodity object in the transaction order. In some implementations, the cumulative sales amount of the financing commodity object may be transferred to the fund account of the associated offline physical store before the offline physical store delivers goods.

The above described method allows the purchaser of the commodity object to receive and start using the corresponding commodity object soon after placing an order to the offline physical store and having the delivery voucher verified. According to practical sales experience, the financing commodity object can be sold out in one or two days after being released. Further, the seller user of the commodity object can obtain fund injection from a third user in advance by means of financing despite a delay in actually receiving the fund from the purchaser. Although the seller user may need to pay certain interest to the third user, the amount of interest would be negligible compared with the income brought by the fast circulation of the commodity object.

It some implementations, whether financing is to be carried out for selling the commodity object may be decided by the first user, and may be specified when the commodity object is released. For example, when the transaction order is generated, an identifier indicating whether financing is to be carried out may be added in the information about the first user. After the delivery voucher passes the verification by the offline physical store, the offline physical store may determine, based on the identifier, whether a financing commodity object is to be generated.

Figure 2:
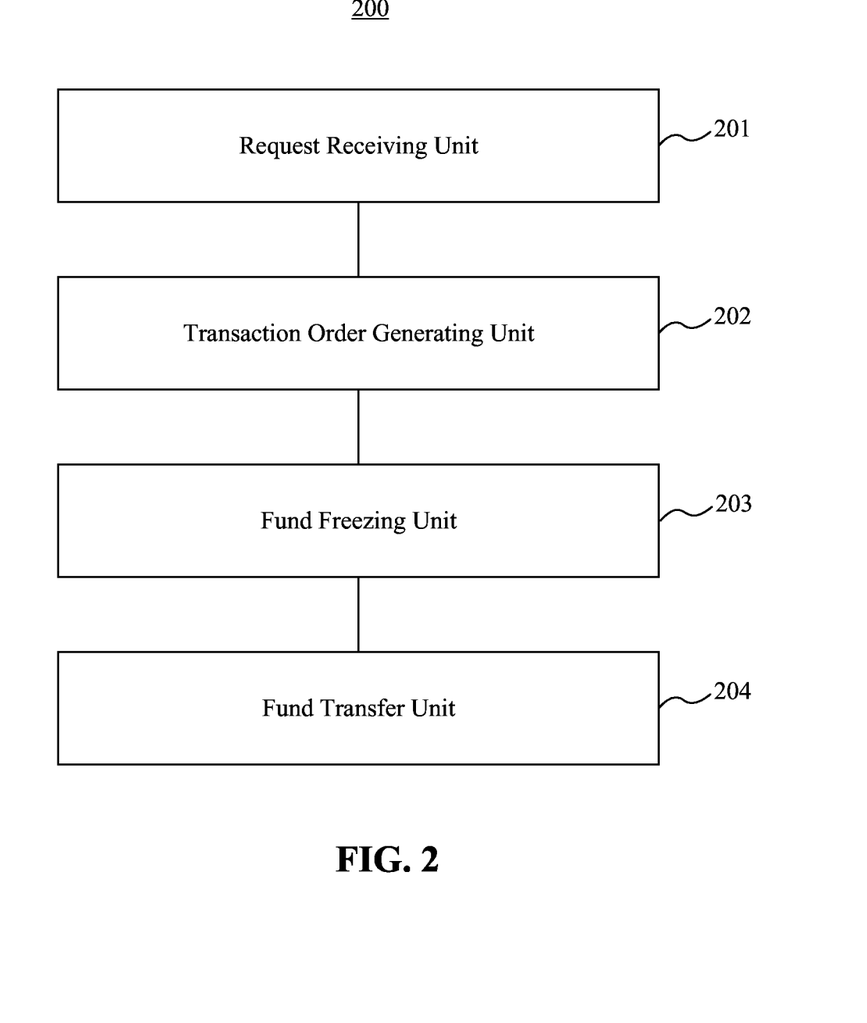
FIG. 2 is a block diagram of an apparatus for processing transaction information for a commodity object, consistent with some embodiments of this disclosure.

FIG. 2 is a block diagram of an apparatus 200 for processing transaction information for a commodity object, consistent with some embodiments of this disclosure. Referring to FIG. 2, the apparatus 200 may include a request receiving unit 201, a transaction order generating unit 202, a fund freezing unit 203, and a fund transfer unit 204.

The request receiving unit 201 is configured to receive a request for purchasing a specified commodity object.

The transaction order generating unit 202 is configured to generate, according to the request, a transaction order, which includes transaction amount information, information about a first user who sells the specified commodity object, and information about a second user who purchases the specified commodity object.

The fund freezing unit 203 is configured to set an amount of fund in a fund account of the second user to a frozen state according to the transaction amount information.

The fund transfer unit 204 is configured to transfer the amount of frozen fund to a fund account of the first user after a preset time period.

In the period after the amount of fund is set to the frozen state and before the frozen fund is transferred to the fund account of the first user, an income produced by the frozen fund during the period may be calculated and transferred to the fund account of the second user. In some implementations, the preset time period may be started from when the amount of fund is frozen.

Figure 3:
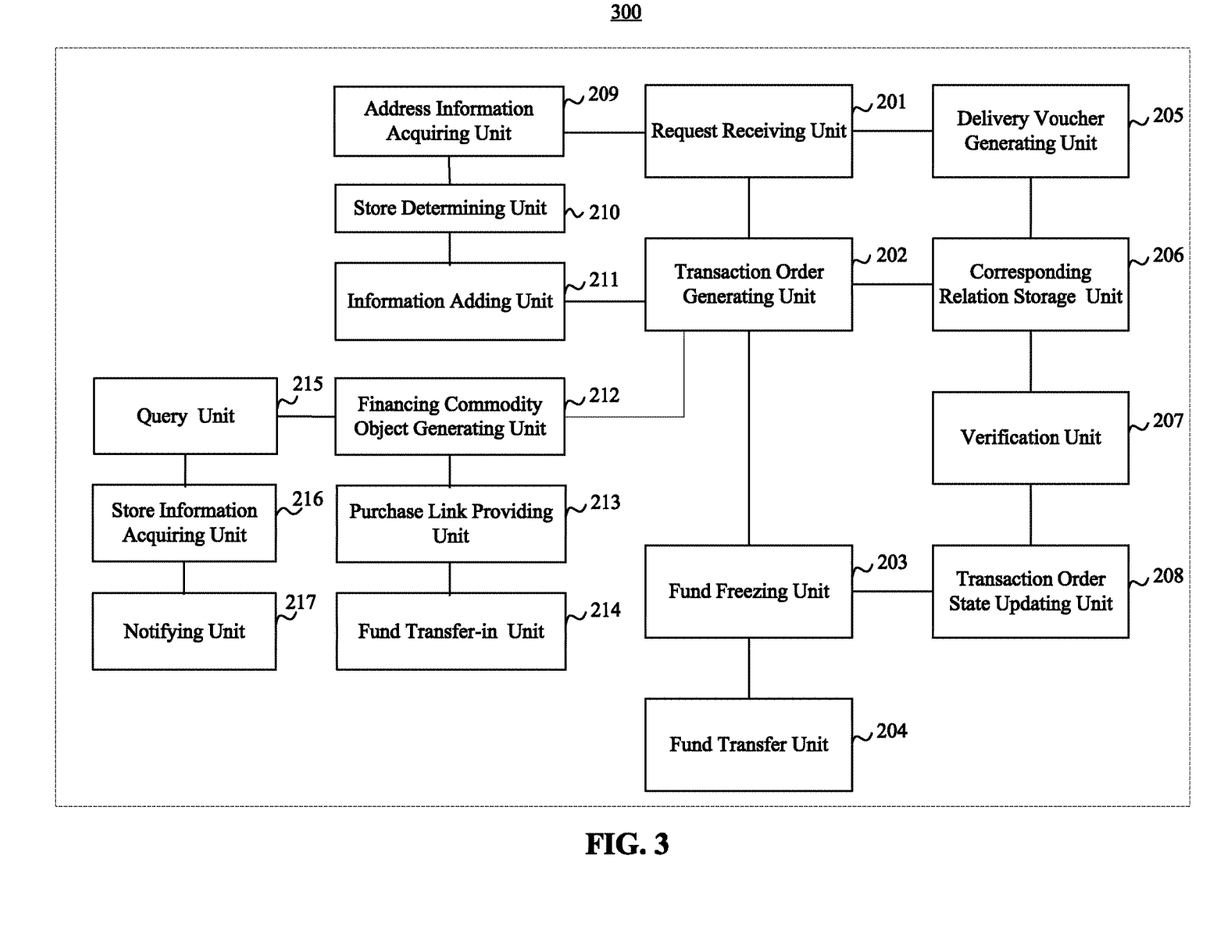
FIG. 3 is a block diagram of another apparatus for processing transaction information for a commodity object, consistent with some embodiments of this disclosure.

FIG. 3 is a block diagram of another apparatus 300 for processing transaction information for a commodity object, consistent with some embodiments of this disclosure. As shown in FIG. 3, in addition to the request receiving unit 201, transaction order generating unit 202, fund freezing unit 203, and fund transfer unit 204, the apparatus 300 may further include a delivery voucher generating unit, 205 a verification unit 207, and a transaction order state updating unit 208. In these embodiments, the information about the first user may include information about an offline physical store associated with the first user.

Figure 4:
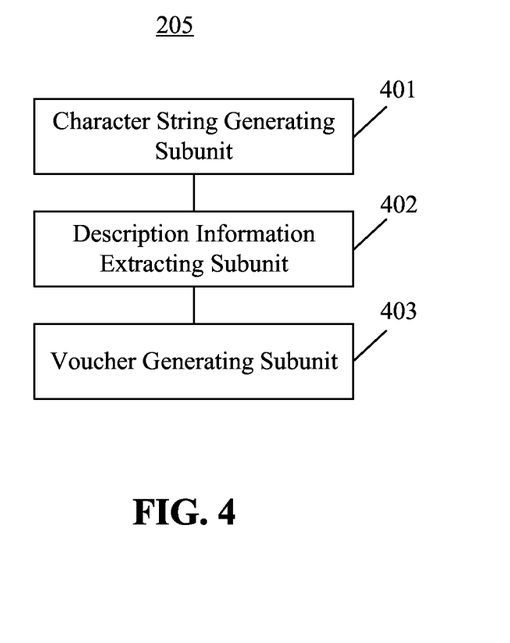
FIG. 4 is a block diagram of a delivery voucher generating unit, consistent with some embodiments of this disclosure.

The delivery voucher generating unit 205 is configured to generate and output a delivery voucher which the second user may use for picking up the goods in an offline physical store. FIG. 4 is a block diagram of a delivery voucher generating unit 205, consistent with some embodiments of this disclosure. As shown in FIG. 4, the delivery voucher generating unit may further include a character string generating subunit 401, a description information extracting subunit 402, and a voucher generating subunit 403. The character string generating subunit 401 may be configured to generate a character string of a preset length. The description information extracting subunit 402 may be configured to extract description information of the specified commodity object from the transaction order. The voucher generating subunit 403 may be configured to generate the delivery voucher to include the character string and the description information of the specified commodity object.

Referring to FIG. 3, to facilitate the verification on the delivery voucher, the apparatus 300 may further include a corresponding relation storage unit 206 configured to store a corresponding relation between the transaction order and the character string after the delivery voucher is generated.

Figure 5:
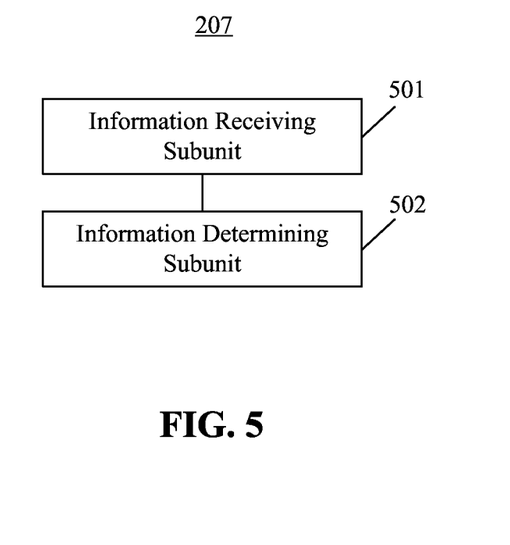
FIG. 5 is a block diagram of a verification unit, consistent with some embodiments of this disclosure.

The verification unit 207 is configured to verify the delivery voucher submitted by the offline physical store. FIG. 5 is a block diagram of a verification unit 207, consistent with some embodiments of this disclosure. As shown in FIG. 5, the verification unit 207 may include an information receiving subunit 501 and an information determining subunit 502. The information receiving subunit 501 may be configured to receive the character string and transaction order identification information that are submitted by a client of the offline physical store for picking up the goods. The information determining subunit 502 may be configured to determine, according to the stored corresponding relation, whether the information submitted by the client of the offline physical store is consistent, and if the information is consistent, the verification succeeds.

The transaction order state updating unit 208 is configured to set the corresponding transaction order to an effective state after the verification succeeds. The preset time period may be started when the transaction order is set to the effective state.

Referring to FIG. 3, the apparatus 300 may further include an address information acquiring unit 209, a store determining unit 210, and an information adding unit 211. Geographical location information of each offline physical store associated with the first user may be stored in advance of the transaction. The address information acquiring unit 209 may be configured to acquire address information related to the second user before the transaction order is generated. The store determining unit 210 may be configured to determine, according to the address information and the geographical location information of each offline physical store, an offline physical store for delivering the goods for the second user. The information adding unit 211 may be configured to add the information of the offline physical store to the transaction order.

As shown in FIG. 3, to assist the first user to obtain a fund injection, the apparatus 300 may further include a financing commodity object generating unit 212, a purchase link providing unit 213, and a fund transfer-in unit 214. The financing commodity object generating unit 212 may be configured to generate a financing commodity object corresponding to the transaction order, according to the order amount, a due time, and the income calculation mode information determined by the first user. The purchase link providing unit 213 may be configured to provide a purchase link of the financing commodity object. The fund transfer-in unit 214 may be configured to, after receiving the purchase information of a third user through the purchase link of the financing commodity object, transfer a fund of an amount purchased by the third user to the fund account of the first user.

Referring to FIG. 3, the apparatus 300 may further include a query unit 215, a store information acquiring unit 216, and a notifying unit 217. The query unit 215 may be configured to query the transaction order corresponding to the financing commodity object when a cumulative sales amount regarding the financing commodity object reaches the transaction amount in the transaction order. The store information acquiring unit 216 may be configured to determine the associated offline physical store from the transaction order. The notifying unit 217 may be configured to notify the client of the associated offline physical store to deliver the specified commodity object in the transaction order. Before the client of the associated offline physical store is notified to deliver the specified commodity object in the transaction order, the fund of the cumulative sales amount may be transferred to a fund account of the associated offline physical store.

In some implementations, after the delivery voucher passes the verification by the associated offline physical store, the associated offline physical store may deliver the specified commodity object in the transaction order without waiting for a notification regarding the financing commodity object.

In exemplary embodiments, a non-transitory computer-readable storage medium including instructions is also provided, and the instructions may be executed by a computing device (such as a personal computer, a server, a network device, or the like), for performing the above-described methods. For example, the non-transitory computer-readable storage medium may be read-only memory (ROM), random access memory (RAM), CD-ROM, magnetic tape, floppy disk and optical data storage device, etc.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for processing transaction information for a commodity object, comprising:

receiving, at a server, a request for purchasing a commodity object;

generating, by the server and based on the request, a transaction order, wherein the transaction order includes transaction amount information, information about a first user selling the commodity object, and information about a second user purchasing the commodity object;

setting an amount of fund in a fund account of the second user to a frozen state according to the transaction amount information;

generating, by the server, a financing commodity object corresponding to the transaction order based on a transaction amount and a due time associated with the transaction amount;

when a cumulative sales amount regarding the financing commodity object reaches the transaction amount in the transaction order, querying the transaction order corresponding to the financing commodity object;
determining, by the server, an associated offline physical store from the transaction order;
notifying, by the server, the associated offline physical store to deliver the commodity object; and
after a preset time period, transferring the amount of fund to a fund account of the first user;
wherein after the amount of fund is set to the frozen state and before the amount of fund is transferred to the fund account of the first user, an income produced by the amount of fund is calculated and transferred to the fund account of the second user.

2. The method of claim 1, wherein the preset time period is started when the amount of fund is frozen.

3. The method of claim 1, wherein the information about the first user includes information about an offline physical store associated with the first user, the method further comprising:
generating a delivery voucher for the second user to pick up the commodity object at the offline physical store;
verifying the delivery voucher submitted by the offline physical store; and
after verification of the delivery voucher succeeds, setting the transaction order to an effective state;
wherein the preset time period is started when the transaction order is set to the effective state.

4. The method of claim 3, wherein generating the delivery voucher comprises:
generating a character string of a preset length;
extracting description information of the commodity object from the transaction order; and
generating the delivery voucher to include the character string and the description information of the commodity object.

5. The method of claim 4, further comprising:
after generating the delivery voucher, storing a corresponding relation between the transaction order and the character string;
wherein verifying the delivery voucher submitted by the offline physical store comprises:
receiving transaction order identification information submitted by the offline physical store and the character string;
determining, according to the stored corresponding relation, whether the character string and the transaction order identification information submitted by the offline physical store are consistent; and
if the character string and the transaction order identification information are consistent, determining that the verification of the delivery voucher succeeds.

6. The method of claim 3, wherein the information about the first user includes information about a plurality of offline physical stores associated with the first user, and geographical location information of each of the plurality of offline physical stores is stored before receiving the request, the method further comprising:
acquiring the address information related to the second user before the transaction order is generated;
determining, according to the address information and the geographical location information of each offline physical store, an offline delivery store for delivering the commodity object for the second user; and
adding the information of the offline delivery store to the transaction order.

7. The method of claim 3, further comprising:
after the verification succeeds, generating the financing commodity object;
providing a purchase link of the financing commodity object; and
after receiving purchase information of a third user through the purchase link of the financing commodity object, transferring a fund of an amount purchased by the third user to the fund account of the first user.

8. The method of claim 7, further comprising:
transferring a fund of the cumulative sales amount to a fund account of the associated offline physical store before the notifying the associated offline physical store to deliver the commodity object.

9. The method of claim 3, wherein after the verification of the delivery voucher succeeds, the commodity object is delivered.

10. An apparatus for processing transaction information for a commodity object, comprising:
a request receiving unit configured to receive a request for purchasing a commodity object;
a transaction order generating unit configured to generate, based on the request, a transaction order, wherein the transaction order includes transaction amount information, information about a first user selling the commodity object, and information about a second user purchasing the commodity object;
a fund freezing unit configured to set an amount of fund in a fund account of the second user to a frozen state according to the transaction amount information;
a financing commodity object generating unit configured to generate a financing commodity object corresponding to the transaction order based on a transaction amount and a due time associated with the transaction amount;
a query unit configured to, when a cumulative sales amount regarding the financing commodity object reaches the transaction amount in the transaction order, query the transaction order corresponding to the financing commodity object;
a store information acquiring unit configured to determine an associated offline physical store from the transaction order;
a notifying unit configured to notify the associated offline physical store to deliver the commodity object; and
a fund transfer unit configured to transfer the amount of fund to a fund account of the first user after a preset time period;
wherein after the amount of fund is set to the frozen state and before the amount of fund is transferred to the fund account of the first user, an income produced by the amount of fund is calculated and transferred to the fund account of the second user.

11. The apparatus of claim 10, wherein the preset time period is started when the amount of fund is frozen.

12. The apparatus of claim 10, wherein the information about the first user includes information about an offline physical store associated with the first user, the apparatus further comprising:
a delivery voucher generating unit configured to generate a delivery voucher for the second user to pick up the commodity object at the offline physical store;
a verification unit configured to verify the delivery voucher submitted by the offline physical store; and
a transaction order state updating unit configured to, after verification of the delivery voucher succeeds, setting the transaction order to an effective state;

wherein the preset time period is started when the transaction order is set to the effective state.

13. The apparatus of claim 12, wherein the delivery voucher generating unit comprises:
a character string generating subunit configured to generate a character string of a preset length;
a description information extracting subunit configured to extract description information of the commodity object from the transaction order; and
a voucher generating subunit configured to generate the delivery voucher to include the character string and the description information of the commodity object.

14. The apparatus of claim 13, further comprising:
a corresponding relation storage unit configured to, after generating the delivery voucher, store a corresponding relation between the transaction order and the character string;
wherein the verification unit comprises:
an information receiving subunit configured to receive transaction order identification information submitted by the offline physical store and the character string;
an information determining subunit configured to:
determine, according to the stored corresponding relation, whether the character string and the transaction order identification information submitted by the offline physical store are consistent; and
if the character string and the transaction order identification information are consistent, determine that the verification of the delivery voucher succeeds.

15. The apparatus of claim 12, wherein the information about the first user includes information about a plurality of offline physical stores associated with the first user, and geographical location information of each of the plurality of offline physical stores is stored before receiving the request, the method further comprising:
an address information acquiring unit configured to acquire the address information related to the second user before the transaction order is generated;
a store determining unit configured to determine, according to the address information and the geographical location information of each offline physical store, an offline delivery store for delivering the commodity object for the second user; and
an information adding unit configured to add the information of the offline delivery store to the transaction order.

16. The apparatus of claim 12, further comprising:
a purchase link providing unit configured to provide a purchase link of the financing commodity object; and
a fund transfer-in unit configured to, after receiving purchase information of a third user through the purchase link of the financing commodity object, transfer a fund of an amount purchased by the third user to the fund account of the first user.

17. The apparatus of claim 16, wherein the fund transfer-in unit is further configured to transfer a fund of the cumulative sales amount to a fund account of the associated offline physical store before the notifying the associated offline physical store to deliver the commodity object.

18. The apparatus of claim 12, wherein after the verification of the delivery voucher succeeds, the commodity object is delivered.

19. A non-transitory computer-readable storage medium that stores a set of instructions that is executable by at least one processor of a server to cause the server to perform a method for processing transaction information for a commodity object, the method comprising:
receiving a request for purchasing a commodity object;
generating, based on the request, a transaction order, wherein the transaction order includes transaction amount information, information about a first user selling the commodity object, and information about a second user purchasing the commodity object;
setting an amount of fund in a fund account of the second user to a frozen state according to the transaction amount information;
generating a financing commodity object corresponding to the transaction order based on a transaction amount and a due time associated with the transaction amount;
when a cumulative sales amount regarding the financing commodity object reaches the transaction amount in the transaction order, querying the transaction order corresponding to the financing commodity object;
determining an associated offline physical store from the transaction order;
notifying the associated offline physical store to deliver the commodity object; and
after a preset time period, transferring the amount of fund to a fund account of the first user;
wherein after the amount of fund is set to the frozen state and before the amount of fund is transferred to the fund account of the first user, an income produced by the amount of fund is calculated and transferred to the fund account of the second user.

20. The non-transitory computer-readable storage medium of claim 19, wherein the preset time period is started when the amount of fund is frozen.

21. The non-transitory computer-readable storage medium of claim 19, wherein the information about the first user includes information about an offline physical store associated with the first user, and wherein the set of instructions that is executable by the at least one processor of the server to cause the server to further perform:
generating a delivery voucher for the second user to pick up the commodity object at the offline physical store;
verifying the delivery voucher submitted by the offline physical store; and
after verification of the delivery voucher succeeds, setting the transaction order to an effective state;
wherein the preset time period is started when the transaction order is set to the effective state.

22. The non-transitory computer-readable storage medium of claim 21, wherein the set of instructions that is executable by the at least one processor of the server to cause the server to further perform:
generating a character string of a preset length;
extracting description information of the commodity object from the transaction order; and
generating the delivery voucher to include the character string and the description information of the commodity object.

23. The non-transitory computer-readable storage medium of claim 22, wherein the set of instructions that is executable by the at least one processor of the server to cause the server to further perform:
after generating the delivery voucher, storing a corresponding relation between the transaction order and the character string;
wherein verifying the delivery voucher submitted by the offline physical store comprises:
receiving transaction order identification information submitted by the offline physical store and the character string;

determining, according to the stored corresponding relation, whether the character string and the transaction order identification information submitted by the offline physical store are consistent; and if the character string and the transaction order identification information are consistent, determining that the verification of the delivery voucher succeeds.

24. The non-transitory computer-readable storage medium of claim 21, wherein the information about the first user includes information about a plurality of offline physical stores associated with the first user, and geographical location information of each of the plurality of offline physical stores is stored before receiving the request, and wherein the set of instructions that is executable by the at least one processor of the server to cause the server to further perform:

acquiring the address information related to the second user before the transaction order is generated;

determining, according to the address information and the geographical location information of each offline physical store, an offline delivery store for delivering the commodity object for the second user; and adding the information of the offline delivery store to the transaction order.

25. The non-transitory computer-readable storage medium of claim 21, wherein the set of instructions that is executable by the at least one processor of the server to cause the server to further perform:

after the verification succeeds, generating the financing commodity object providing a purchase link of the financing commodity object; and after receiving purchase information of a third user through the purchase link of the financing commodity object, transferring a fund of an amount purchased by the third user to the fund account of the first user.

26. The non-transitory computer-readable storage medium of claim 25, wherein the set of instructions that is executable by the at least one processor of the server to cause the server to further perform:

transferring a fund of the cumulative sales amount to a fund account of the associated offline physical store before the notifying the associated offline physical store to deliver the commodity object.

27. The non-transitory computer-readable storage medium of claim 21, wherein after the verification of the delivery voucher succeeds, the commodity object is delivered.

* * * * *

UNITED STATES PATENT AND TRADEMARK OFFICE
CERTIFICATE OF CORRECTION

PATENT NO. : 10,229,451 B2
APPLICATION NO. : 14/745119
DATED : March 12, 2019
INVENTOR(S) : Xichun Liu et al.

Page 1 of 1

It is certified that error appears in the above-identified patent and that said Letters Patent is hereby corrected as shown below:

On the Title Page

Item (30), in the Foreign Application Priority Data:
"2014 1 0347949" should read as --201410347949.9--

Signed and Sealed this
Twenty-fifth Day of June, 2019

Andrei Iancu
*Director of the United States Patent and Trademark Office*